United States Patent
Paone et al.

(10) Patent No.: US 8,301,509 B2
(45) Date of Patent: Oct. 30, 2012

(54) ONLINE NEGOTIATION SYSTEM AND METHOD

(75) Inventors: Dean M. Paone, Bay Head, NJ (US); Thomas LoBue, Hoboken, NJ (US)

(73) Assignee: eGoC8.com LLC, Hoboken, NJ (US)

( * ) Notice: Subject to any disclaimer, the term of this patent is extended or adjusted under 35 U.S.C. 154(b) by 346 days.

(21) Appl. No.: 12/637,034

(22) Filed: Dec. 14, 2009

(65) Prior Publication Data

US 2011/0145084 A1   Jun. 16, 2011

(51) Int. Cl.
 *G06Q 30/00* (2012.01)
(52) U.S. Cl. .................. 705/26.3; 705/26.41; 705/26.1; 705/26.61; 705/27.1
(58) Field of Classification Search .................... 705/26, 705/27, 26.3, 26.41, 26.61, 27.1
See application file for complete search history.

(56) References Cited

U.S. PATENT DOCUMENTS

| 7,249,114 B2 | 7/2007 | Burchetta et al. |
| 7,296,001 B1 | 11/2007 | Ephrati et al. |

*Primary Examiner* — Jeffrey A Smith
*Assistant Examiner* — Courtney Stopp
(74) *Attorney, Agent, or Firm* — Eckert Seamans Cherin & Mellott, LLC

(57) ABSTRACT

A computer system and method carried out by the system for assisting parties in negotiation the sale price of real estate or personal property is disclosed wherein a web server receives a property listing from a seller at an asking price, receives a bid from a buyer at an offer price, compares the asking price to the offer price and determines whether the difference between the offer price and asking price is within a first, second, or third predetermined % value and notifies the parties whether they are cold, warm, hot, or matched. If there is a match, an agreement of sale may be generated.

17 Claims, 1 Drawing Sheet

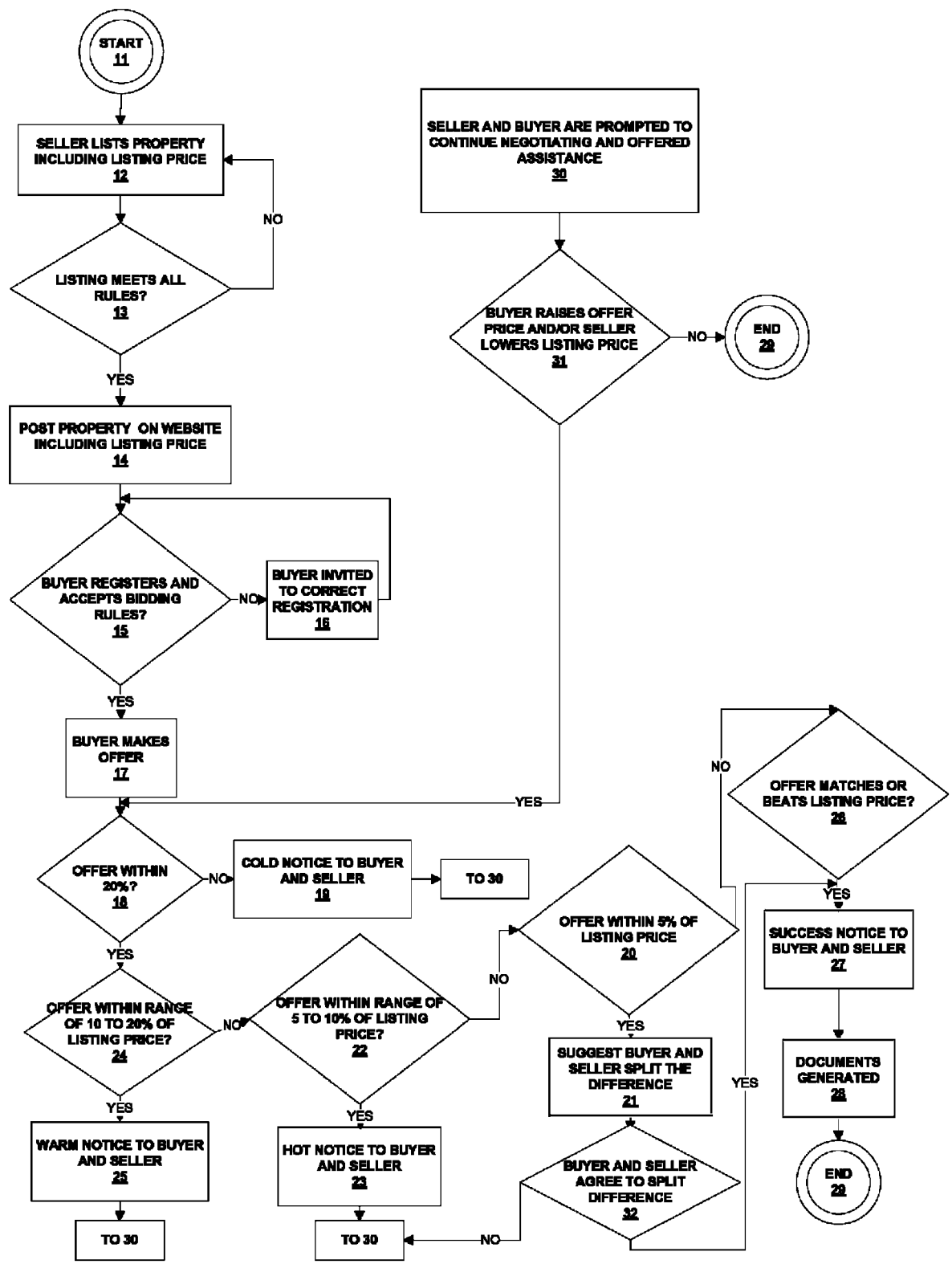

ONLINE NEGOTIATION SYSTEM AND METHOD

BACKGROUND OF THE INVENTION

This invention relates to computer systems and methods which relate to online negotiations in connection with sales of real and personal property.

Online negotiations systems have been disclosed in the prior art, for example U.S. Pat. No. 7,296,001 (Ephrati, et al, Ariba, Inc.) discloses a system and method for managing negotiations, including bilateral or one-on-one, one to many, and multilateral negotiations where the response to the initial offer and any other counteroffers and responses are all structured according to rules within the online computer system. Ephrarti teaches a structured negotiation process where the response to the initial offer and any other counteroffers and responses are all structured according to rules within the online computer system.

Websites such as sites such as www.cybersettle.com facilitate an online settlement process for the settlement of personal injury lawsuits and disputes but are not useful for on-line negotiating over anything else.

Burchetta, et al., U.S. Pat. No. 7,249,114, and its parent patents assigned to Cybersettle Holdings, Inc., disclose a computerized dispute resolution process in which two parties each submit demands and offers. If an offer and demand are not within a pre-established difference, no further offers or demands may be made during a round.

In conventional negotiations over purchase of a house or other property, a seller may list his house or property in a "multiple listing service" through which real estate agents have access to the particulars of the property, including an asking price. An agent may communicate a buyer's offer by telephone, fax, letter, or email and the seller or seller's agent may respond with an acceptance or counter-offer. Further rounds of offers and counter-offers may take place until the negotiation process ends with parties walking away or agreeing on a price and conditions. In such negotiations, price is often not the only variable; sometimes date of settlement, who will be responsible for improvements, how much furniture is included in the deal, and the like can be offered or requested.

SUMMARY OF THE INVENTION

The present invention comprises a computer which is programmed with a set of instructions enabling it to receive a property listing from a seller at a listing price, receive a bid from a buyer at an offer price, compare the listing price to the offer price and determine whether the difference between the offer price and listing price is within a first, second, or third predetermined percentage value, wherein if the offer is within the first predetermined value, the system notifies the buyer and seller that the bid and offer are so close that the parties should consider splitting the difference, wherein if the offer is within the second predetermined value, the system notifies the buyer and seller that the offer is "hot" or its equivalent, and prompts and assists the parties to negotiate further, wherein if the offer is within the third predetermined value, the system notifies the buyer and seller that the offer is "warm" or its equivalent, and prompts and assists the parties to negotiate further, and if the offer is further apart than the third predetermined value, the system notifies the buyer and seller that the offer is "cold" or its equivalent and prompts and assists the parties to negotiate further.

The invention also comprises a computer executable method implemented by the computer system comprising receiving a listing of property at a remote web server, posting the listing on a website, receiving an offer from a buyer, calculating whether the offer is within a within a first, second, or third predetermined percentage value, wherein if the offer is within the first predetermined value, automatically the buyer and seller that the bid and offer are so close that the parties should consider splitting the difference, wherein if the offer is within the second predetermined value, automatically the buyer and seller that the offer is "hot" or its equivalent and prompts and assists the parties to negotiate further, wherein if the offer is within the third predetermined value, automatically the buyer and seller that the offer is "warm" or its equivalent and prompts and assists the parties to negotiate further, and if the offer is further apart than the third predetermined value, automatically the buyer and seller that the offer is "cold" or its equivalent and prompts and assists the parties to negotiate further.

The steps of prompting the parties to improve their bids and offers and assist the parties in negotiating further are preferred but are not required.

The computer system can be a web server connected to the Internet or it can be connected to a private network associated with a real estate brokerage, for example.

The property can be real estate, for example a home, commercial building, apartment, or land, or it can be personal property, for example a car, truck, or commercial equipment, for example.

The method and system of the invention are best used to assist with negotiations over the price of such a property of the type which has traditionally been assisted by a broker or agent where the names of the parties are not revealed to each other until the negotiation has been successfully concluded and an agreement of sale has been reached. In some embodiments of this invention, an agreement of sale may be automatically generated. Preferably each bidder and listing party agrees in advance that their electronic signature will be binding so that at the successful completion of the process the automated agreement of sale is binding without further signatures, an advantage over traditional property negotiations where the broker or agent must obtain signatures after the deal is concluded.

Another feature for some embodiments is to have the bidder and listing party, i.e., buyer and seller, agree before a bid is made, to rules which can include the aforementioned advance agreement that electronic signatures are binding, as well as other rules.

BRIEF DESCRIPTION OF THE DRAWINGS

The following detailed description may be best understood by reference to the following drawings in which:

FIG. 1 is a flow chart illustrating an embodiment of a method according to the invention.

DETAILED DESCRIPTION

The following non-limiting embodiment is described for purposes of illustrating the invention wherein the process starts 11 by a seller listing a property 12 by inputting a listing price and describing the property location, details, photographs, and related information of the type conventional multiple listing services receive. An electronic signature of the seller and acceptance of the rules are required to proceed from step 12. The computer system, which may be a remote web server in communication with the internet, tests 13 to determine whether the listing meets all of the rules which are normally disclosed to the buyer and other parties. If the listing meets all of the rules, it is posted 14 on a website and the listing price and detailed property description can be viewed by prospective buyers who have been pre-qualified. The pre-qualification step may be conducted by requesting information and documentation from the buyer and comparing to predetermined thresholds to confirm that the buyer can afford the property. The pre-qualification process may be part of a buyer registration process 15 where the buyer must provide an electronic signature and accept bidding rules which are explained during the buyer registration process. If the buyer does not meet the registration requirements, he may be invited 16 to correct his registration, or he may be rejected as non-qualified.

If the buyer qualifies and properly registers, he may make an offer 17 to purchase the property under all of the conditions in the listing at a proposed price (the "offer"). The amount offered is not disclosed to the seller. The system compares the offer price to the listing price and if the offer is calculated 18 to be more than a predetermined but not disclosed percentage difference below the listing price, e.g., 20% in this example, the buyer and seller are notified 19 that the offer is "cold," without disclosing the dollar amount. The amount or percentage by which the offer and asking price are separated is not disclosed to the parties by the system. If the offer is very close to the listing or asking price, within 20 a first predetermined value, e.g., the offer being less than 5% below the listing price in this example, the system either notifies 21 the parties that they should consider splitting the difference in some embodiments or automatically splits the difference, arrives at a deal price halfway between the last offer and last listing price, and notifies the parties that they have a deal at that deal price. In the latter case, the rules agreed to at steps 13 and 15 would include provisions for splitting the difference when the bid and listing price are within 5% of each other, for example. In the former case, where the system notifies 21 the parties that they should consider splitting the difference, if the buyer and seller each agree 32 to split the difference, a success notice is sent 27 to the buyer and seller. If the parties do not agree to split the difference, they are prompted 30 to continue negotiations. An alternative to suggesting 21 that the parties split the difference, the system may ask the parties whether they agree to split the difference halfway between the last offer and last listing prices. If the offer is in a second predetermined range 22, e.g., between 5 and 10% below the offer price in this example, the buyer and seller are notified 23 that the offer is close or "hot." If the offer is between the "hot" and "cold" predetermined thresholds, e.g. 10 to 20% in this example 24, the buyer and seller are notified 25 that they are getting "warm."

When a warm notice 25, cold notice 19, a hot notice 23, or a notice 21 that the parties are within 5% is sent to the buyer and sellers, at the same time a notice 30 is sent to both the buyer and seller in which the buyer is prompted to make a better offer and the seller is prompted to lower the listing price; and each party is offered assistance. If the buyer raises the offer and/or the seller lowers the listing price, the system then compares the offer to the listing price again starting at decision block 18 and repeating until an offer matches or beats a listing price 26.

If the offer matches the asking price 26, a success notice is sent to the buyer and seller, and the buyer is notified 27 of the price at which he has bought or can buy the property. If the offer price exceeds the asking price, the system determines the sale price or agreed price to be the last listing price. In addition to the success notice indicating that the parties have reached an agreement on price, the system can automatically generate 28 an electronic agreement of sale which includes information comprising the names of the buyer and seller; and the price at which the bidder has matched the most recent offer price. At this point, the process can end 29.

Among the advantages of the computer system and method of the invention are that the parties can be guided in their negotiations by receiving advice as to whether their offer and bid prices are very close, fairly close, relatively close, or far apart, and they are prompted to submit additional bids and offers if they wish to continue negotiating. In the illustrated embodiment, the parties will be prompted to submit bids at minimum increments of 1% of the listing price. The method is a double blind negotiating process which does not give away either party's position, eliminates puffery and posturing, is convenient and easy to use, allows access from any computer in the world at any time, eliminates phone calls, keeps both parties motivated and interested and eliminates hard feelings. Buyers can be charged for allowing bidding in the system and sellers can be charged per use or for a fixed term such as a year.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A computer system comprising a server which comprises computer memory storage and a processor which is programmed with a set of instructions that when executed
   establish a first tier, second tier, and third tier,
   assign a difference value or spread number to the first tier,
   assign a difference value or spread number to the second tier which is higher than the value or number assigned to the first tier,
   assign a difference value or spread number to the third tier which is higher than the value or number assigned to the second tier,
   reveal only first, second, and/or third tier status to the prospective buyer and seller and not the difference values or spread numbers,
   receive a real estate or personal property listing from a seller of the property at a first ask price,
   receive a bid from a prospective buyer of the property at a first bid price,
   compare the first ask price to the first bid price,
   calculate whether the difference between the first bid price and first ask price is within the first, second, or third tier,
   wherein if the calculated difference between the first bid and first ask prices is within the first predetermined value and thus within the first tier, if the buyer and seller have previously agreed to split the difference between a bid price and an ask price if the bid price and ask price are within a stated amount or percentage, automatically split the difference and notify the prospective buyer and seller that they have reached an agreement at a system calculated price, wherein if the buyer and seller have not previously agreed to split the difference between a bid price and an ask price if the first bid and ask prices are within a stated amount or percentage, notify the buyer and seller that the calculated difference between the bid and ask prices is within the first tier and that the parties should consider splitting the difference, wherein if the calculated difference is within the second predetermined value, notify the buyer and seller that the calculated difference is within the second tier, wherein if the calculated difference is within the third predetermined value, notify the buyer and seller that the offer is within the third tier, and if the calculated difference is greater than the third predetermined value, notify the buyer and seller that the calculated difference is greater than the third tier, receive one or more subsequent bids from a buyer only if the subsequent bid price is at least 1% higher than the highest preceding bid price or one or more subsequent ask price from a seller only if the subsequent ask price is at least 1% lower than the lowest preceding ask price;

notifying the seller if a subsequent bid price at least 1% higher than the highest preceding bid price is received and notifying the buyer if a subsequent ask price at least 1% lower than the lowest preceding ask price is received;

notifying the seller and the buyer if a subsequent bid price or subsequent ask price causes the calculated difference to be in a higher tier, thereby encouraging the buyer to increase the bid price by at least one percent or encouraging the seller to reduce the ask price by at least one percent.

2. The system according to claim 1 wherein the programmed instructions require the seller to accept listing rules before a listing is accepted and to require the buyer to accept bidding rules before a bid is accepted.

3. The system according to claim 1 wherein the listing rules and bidding rules each comprise acceptance of an electronic signature as being binding.

4. The system of claim 1 wherein the programmed instructions when executed notify the seller and the bidder that the bidder has matched the most recent offer price.

5. The system of claim 4 wherein the set of instructions when executed generate an electronic agreement of sale which includes information comprising the names of the buyer and seller; and the price at which the bidder has matched the most recent offer price.

6. The system of claim 1 wherein the set of instructions when executed accept revised ask prices from the seller and revised bid prices from the buyer until the bidder has matched the most recent offer price or either the buyer or seller discontinues negotiations.

7. The system of claim 1 wherein the second tier is identified as hot, the third tier is identified as warm, and a calculated difference greater than the third tier is designated as cold.

8. The system of claim 1 comprising generate a sales agreement when a bid is equal to or higher than an ask price at a price which is the most recent bid price.

9. A method comprising programming a computer system which comprises computer memory storage and a processor with a set of instructions which establish a first tier, second tier, and third tier, assign a difference value or spread number to the first tier, assign a difference value or spread number to the second tier which is higher than the value or number assigned to the first tier, assign a difference value or spread number to the third tier which is higher than the value or number assigned to the second tier, reveal only first, second, and/or third tier status to the prospective buyer and seller and not the difference values or spread numbers, receive a real estate or personal property listing from a seller of the property at a first ask price, receive a bid from a prospective buyer of the property at a first bid price, compare the first ask price to the first bid price, calculate whether the difference between the first bid price and first ask price is within the first, second, or third tier, wherein if the calculated difference between the first bid and first ask prices is within the first predetermined value and thus within the first tier, if the buyer and seller have previously agreed to split the difference between a bid price and an ask price if the bid price and ask price are within a stated amount or percentage, automatically split the difference and notify the prospective buyer and seller that they have reached an agreement at a system calculated price, wherein if the buyer and seller have not previously agreed to split the difference between a bid price and an ask price if the first bid and ask prices are within a stated amount or percentage, notify the buyer and seller that the calculated difference between the bid and ask prices is within the first tier and that the parties should consider splitting the difference, wherein if the calculated difference is within the second predetermined value, notify the buyer and seller that the calculated difference is within the second tier, wherein if the calculated difference is within the third predetermined value, notify the buyer and seller that the offer is within the third tier, and if the calculated difference is greater than the third predetermined value, notify the buyer and seller that the calculated difference is greater than the third tier, receive one or more subsequent bids from a buyer only if the subsequent bid price is at least 1% higher than the highest preceding bid price or one or more subsequent ask price from a seller only if the subsequent ask price is at least 1% lower than the lowest preceding ask price;

notify the seller if a subsequent bid price at least 1% higher than the highest preceding bid price is received and notifying the buyer if the subsequent ask price at least 1% lower than the lowest preceding ask price is received;

notify the seller and the buyer if a subsequent bid price or subsequent ask price causes the calculated difference to be in a higher tier, thereby encouraging the buyer to increase the bid price by at least one percent or encouraging the seller to reduce the ask price by at least one percent.

10. The method according to claim 9 further including the step of requiring the seller to accept listing rules before a listing is accepted and to require the buyer to accept bidding rules before a bid is accepted.

11. The method according to claim 9 further including the step of requiring the seller and buyer to accept electronic signatures as being binding.

12. The method of claim 9 further including the step of prompting each party to continue negotiation by making a better bid or better offer upon notice that the parties are cold, warm, or hot.

13. The method of claim 9 wherein if the most recent bid matches the most recent offer, the step of notifying the seller and the bidder that the bidder has matched the most recent offer price.

14. The method of claim 13 further including the step of creating and delivering an electronic agreement of sale which includes information comprising the names of the buyer and seller; and the price at which the bidder has matched the most recent offer price.

15. The method of claim 9 further comprising the steps of accepting revised offer prices from the seller and revised bid prices from the buyer until the bidder has matched the most recent offer price or either the buyer or seller discontinues negotiations.

16. The method of claim 9 wherein the second tier is identified as hot, the third tier is identified as warm, and a calculated difference greater than the third tier is designated as cold.

17. The method of claim 9 comprising generate a sales agreement when a bid is equal to or higher than an ask price at a price which is the most recent bid price.

* * * * *